ined States Patent (12) United States Patent
Wu et al.

(10) Patent No.: US 10,081,284 B2
(45) Date of Patent: Sep. 25, 2018

(54) ARMREST RELEASE MECHANISM (71) Applicant: Lear Corporation, Southfield, MI (US)

(72) Inventors: XiaoZhong Wu, Shanghai (CN);
Xiangbin Hu, Shanghai (CN)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/387,815

(22) Filed: Dec. 22, 2016

(65) Prior Publication Data
US 2018/0178689 A1    Jun. 28, 2018

(51) Int. Cl.
A47C 7/54        (2006.01)
B60N 2/75        (2018.01)
B60N 2/46        (2006.01)

(52) U.S. Cl.
CPC .............. B60N 2/787 (2018.02); B60N 2/464 (2013.01); B60N 2/4673 (2013.01); B60N 2/77 (2018.02)

(58) Field of Classification Search
CPC ........ B60N 2/4673; B60N 2/464; B60N 2/46; B60N 2/4626; B60N 2/4633
USPC ............................. 297/411.26–411.28, 411.3, 297/411.31–411.32, 113, 151, 234, 238
See application file for complete search history.

(56) References Cited

U.S. PATENT DOCUMENTS

| 4,968,092 | A | * | 11/1990 | Giambrone | A47D 1/008 292/36 |
| 5,489,138 | A | * | 2/1996 | Mariol | A47D 1/004 297/151 |
| 5,752,739 | A | * | 5/1998 | Saeki | B60N 2/4613 297/113 |
| 6,048,027 | A | * | 4/2000 | Peck | B60N 2/3084 297/238 |
| 7,104,609 | B2 | * | 9/2006 | Kim | A47C 1/03 297/411.35 |
| 2014/0125107 | A1 | | 5/2014 | Cha et al. | |

FOREIGN PATENT DOCUMENTS

DE          10052838 A1      5/2002

* cited by examiner

Primary Examiner — Mark R Wendell
(74) Attorney, Agent, or Firm — MacMillan, Sobanski & Todd, LLC (57) ABSTRACT A vehicle armrest includes an armrest base having a pivot axle that extends along a pivot axis. The armrest also includes a release mechanism that includes a pair of latch extensions that are supported on the armrest base for relative movement along a latch axis. The latch axis is substantially parallel to the pivot axis. The release mechanism also includes a latch spring that biases the latch extensions apart from each other.

4 Claims, 7 Drawing Sheets

ARMREST RELEASE MECHANISM

BACKGROUND OF THE INVENTION

The present invention relates in general to a release mechanism for a vehicle armrest and, more specifically, to a mechanism that allows a center armrest to be selectively latched into position relative to a bench-type vehicle seat.

Vehicles such as passenger cars may include various types of seats for operators and passengers. This can include bench seats that accommodate multiple occupants, as well as bucket seats that accommodate a single occupant. Many vehicle seats also include armrests for the comfort of occupants. These armrests may be located on either or both sides of the occupant.

Vehicle armrests may be located in various locations depending on the layout of the interior of the vehicle. Vehicle armrests may be located on a trim panel, such as on an interior surface of a door or on a center console that is located adjacent to the seat. Vehicle armrests may also be mounted to the seats. Armrests that are mounted on vehicle seats are often movable between multiple positions. In a vehicle captain's seat, for example, armrests on either side of the seat may be provided that may be moved between a lowered use position and a raised storage position. These armrests are typically moved to the storage position in order to make it easier for the occupant to get in and out of the seat. In a vehicle bench seat, a center armrest may be moved between a lowered use position and a raised storage position. These center armrests are typically moved to the storage position in order to provide space for a third person to sit on the bench seat. Any of these movable armrests may be mounted to the respective seats for rotational movement. This allows the occupant to rotate the armrest to a storage position that is generally parallel to the seat back.

Some vehicle armrests include a retainer mechanism to prevent the armrest from moving out of the use position or the storage position inadvertently. This retainer mechanism will keep the armrest in the position selected by the occupant until the occupant decides to move the armrest. The retainer mechanism may include a frictional engagement between the armrest and the seat. For example, the upholstery of the armrest may press against the upholstery of the seat in order to limit undesired movement of the armrest. The retainer mechanism may include an active lock or latch that prevents movement of the armrest until released by the occupant. This type of active latch may more securely hold the armrest in place to help prevent undesired movement of the armrest caused by a sudden acceleration or deceleration of the vehicle. A release mechanism such as a lever or button may be activated by the occupant in order to release the latch when the occupant desires to move the armrest. It would be advantageous to have an improved mechanism to latch an armrest in place relative to a vehicle seat while allowing the occupant to selectively release that latch.

SUMMARY OF THE INVENTION

The invention relates to an armrest. The armrest includes an armrest base that includes a pivot axle that defines a pivot axis. The armrest also includes a release mechanism that includes a pair of latch extensions that are supported on the armrest base for relative movement along a latch axis. The latch axis is substantially parallel to the pivot axis. The release mechanism also includes a latch spring that biases the latch extensions apart from each other.

The invention further relates to an armrest that includes a slider support on the armrest base for relative movement along a slide axis. The slider includes a pair of extension slots that are at an angle relative to the slide axis. Each of the latch extensions includes an extension pin that is located in one of the extension slots. When the slider moves in a release direction parallel to the slide axis, the extension pins engage the respective extension slot, and the latch extensions are moved parallel to the latch axis toward each other.

The invention further relates to an armrest that includes a release handle supported on the armrest base for relative rotational movement. When the release handle is moved in a handle release direction relative to the base, the slider is moved in the release direction. In other embodiments of the invention, when the latch spring the biases the latch extensions apart from each other, it biases the slider in a direction opposite the release direction. In other embodiments of the invention, when the slider is biased in the direction opposite the release direction, the release handle is biased in a direction opposite the handle release direction.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
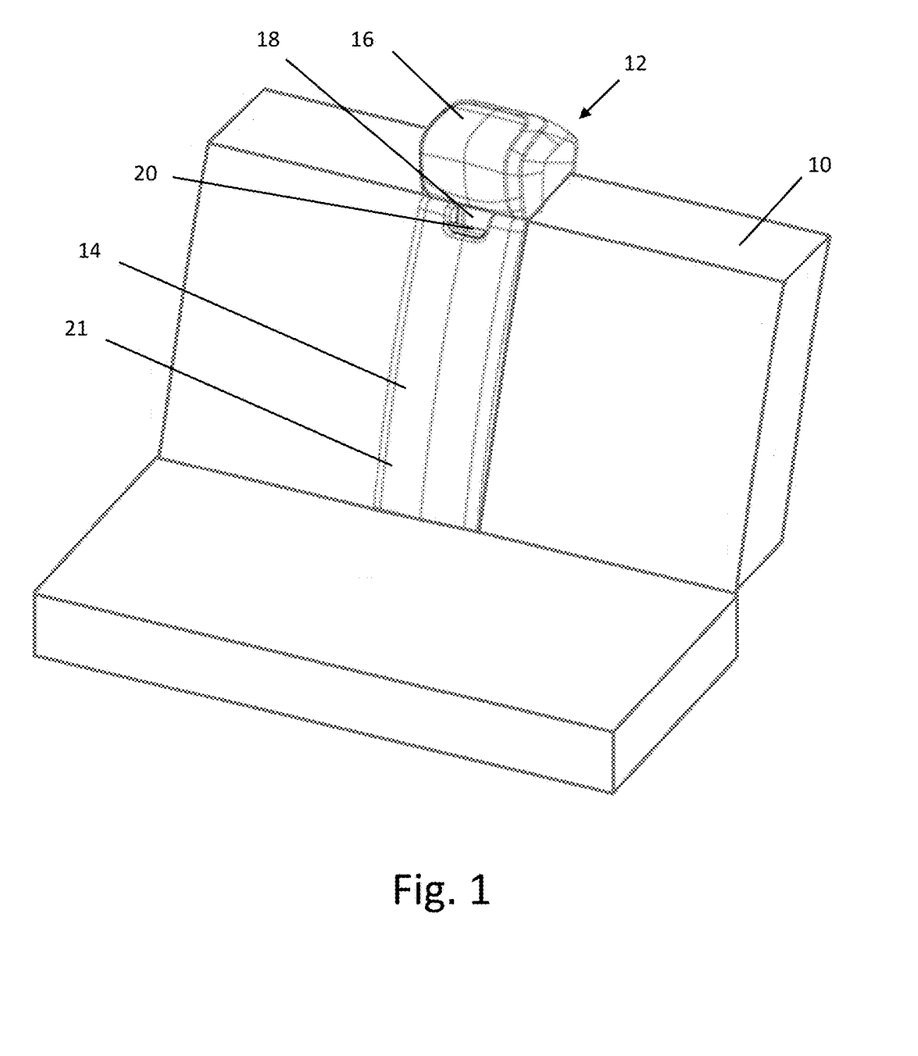
FIG. 1 is a perspective view of a bench-type vehicle seat including an armrest in accordance with this invention.

Referring now to the drawings, there is illustrated in FIG. 1 a bench-type vehicle seat 10 that includes a center armrest, indicated generally at 12. The armrest 12 includes a body portion 14 and a headrest portion 16. The armrest 12 is shown in a storage position, where the armrest 12 is raised relative to the seat 10 and the seat 10 is configured to accommodate three occupants. The armrest 12 may be rotated relative to the seat 10 to a use position, as is well known in the art, where the seat 10 is configured to accommodate two occupants, with the armrest 12 located between them. The armrest 12 includes a handle opening 18 and a release handle 20 that is accessible to the occupants. The release handle 20 may be operated to allow rotation of the armrest 12 relative to the seat 10, as described below. The armrest 12 also includes a trim 21 that covers the underlying structure.

Figure 2:
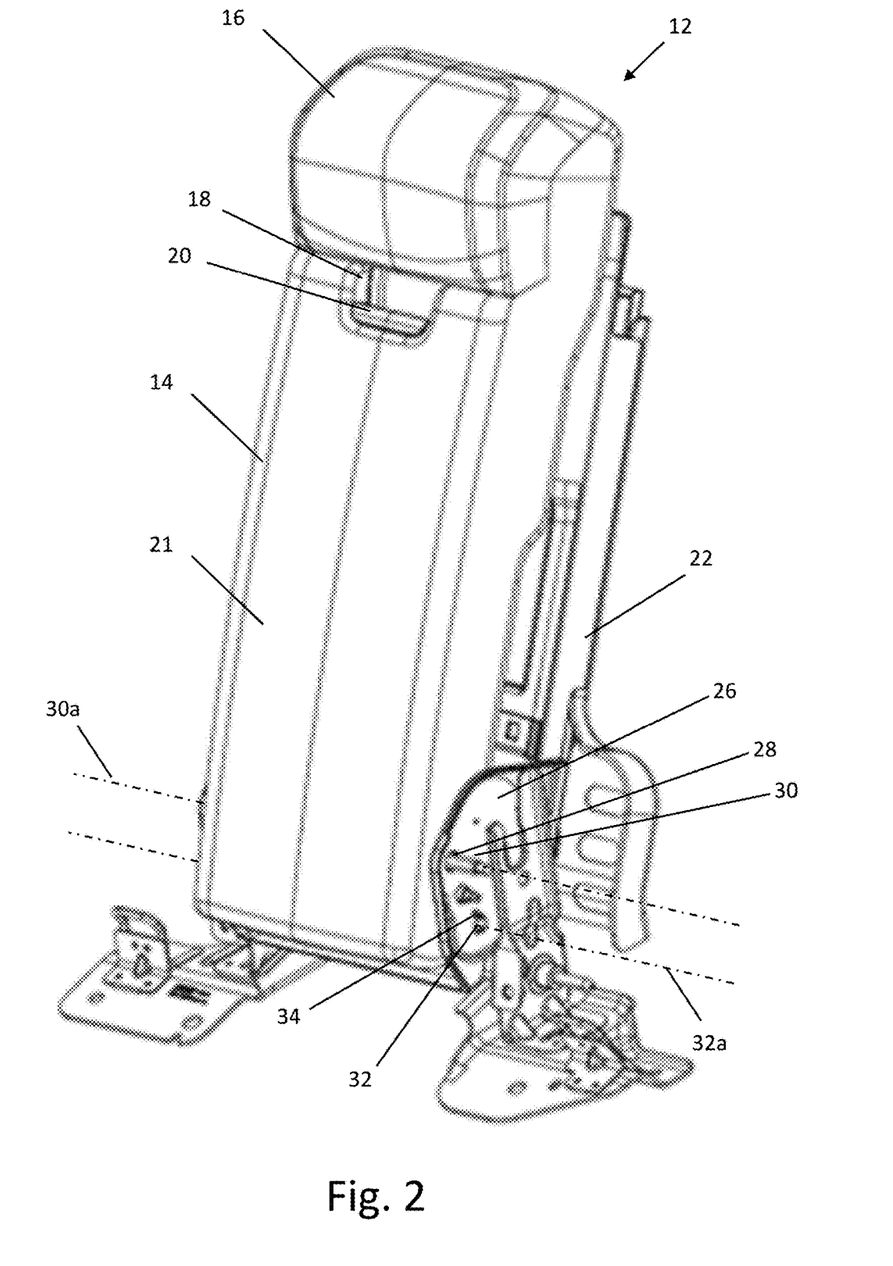
FIG. 2 is an enlarged perspective view of the armrest illustrated in FIG. 1 with an associated frame.
Figure 3:
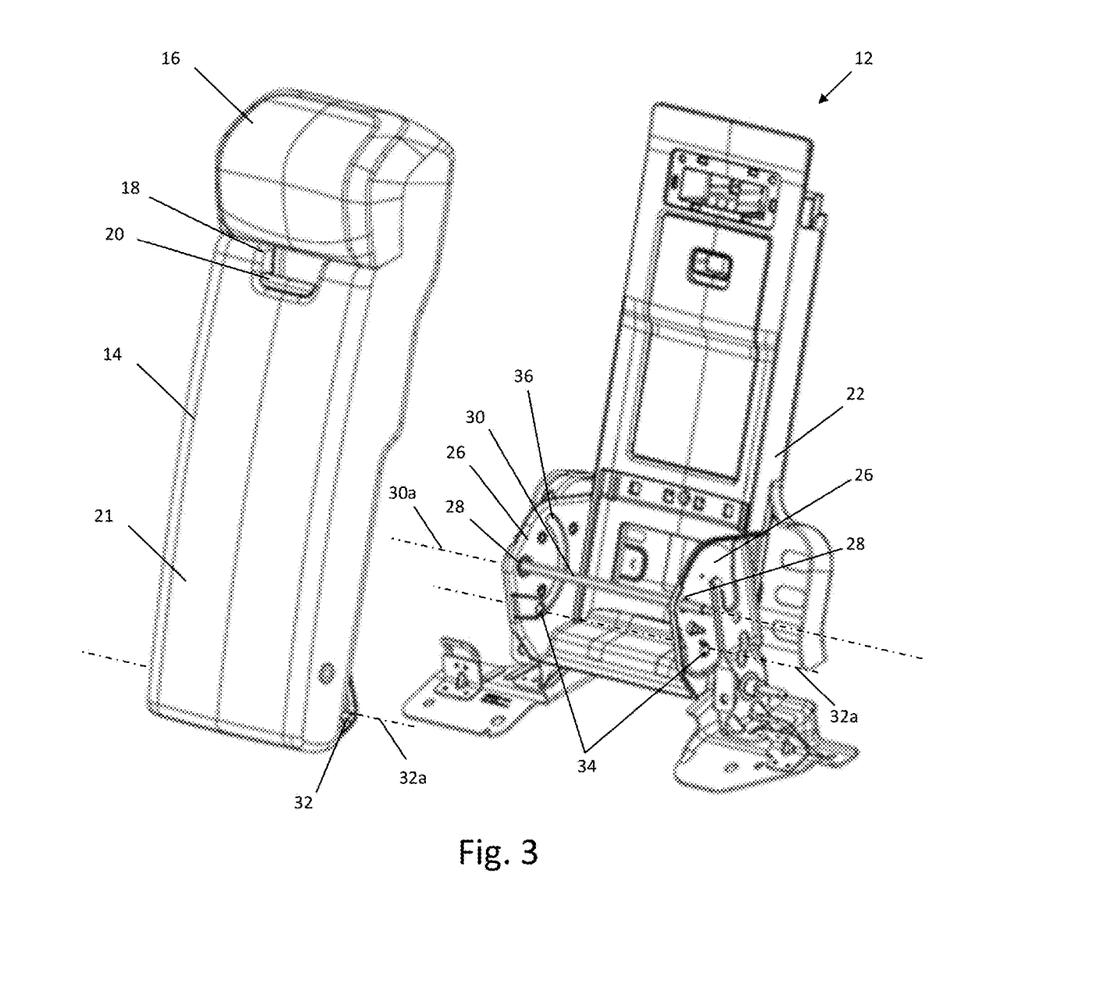
FIG. 3 is an exploded perspective view of armrest and the frame illustrated in FIG. 2.

Referring now to FIG. 2 and FIG. 3, the armrest 12 and an associated frame 22 are shown apart from the seat 10. The armrest 12 is attached to the frame 22 for relative rotational movement. The frame 22 includes a pair of opposed support plates 26 that are located on opposed sides of the body portion 14 of the armrest 12. Each of the support plates 26 includes an axle opening 28. The armrest 12 includes a pivot axle 30 that passes through the axle opening 28 on each support plate 26. The armrest 12 is supported on the pivot axle 30 such that the armrest 12 is able to rotate relative to support plates 26 about a pivot axis 30a defined by the pivot axle 30.

The armrest 12 also includes a pair of latch pins 32, only one is visible in FIG. 2 and FIG. 3. The latch pins 32 extend from opposed sides of body portion 14 of the armrest 12. The latch pins 32 define a latch axis 32a that is substantially parallel to the pivot axis 30a. Each of the support plates 26 includes a latch opening 34. As shown in FIG. 2, each latch pin 32 extends from the armrest 12 into one of the latch openings 34. When the latch pins 32 are positioned in the respective latch openings 34, the latch pins 32 engage the respective support plate 26 and prevent rotation of the armrest 12 relative to the frame 22. Each support plate 26 includes an optional latch pin channel 36, one of which is visible in FIG. 3. Each latch pin channel 36 is a depression in the surface of the respective support plate 26, and each latch pin channel 36 has a semi-circular shape and is centered on the pivot axis 30a.

Figure 4:
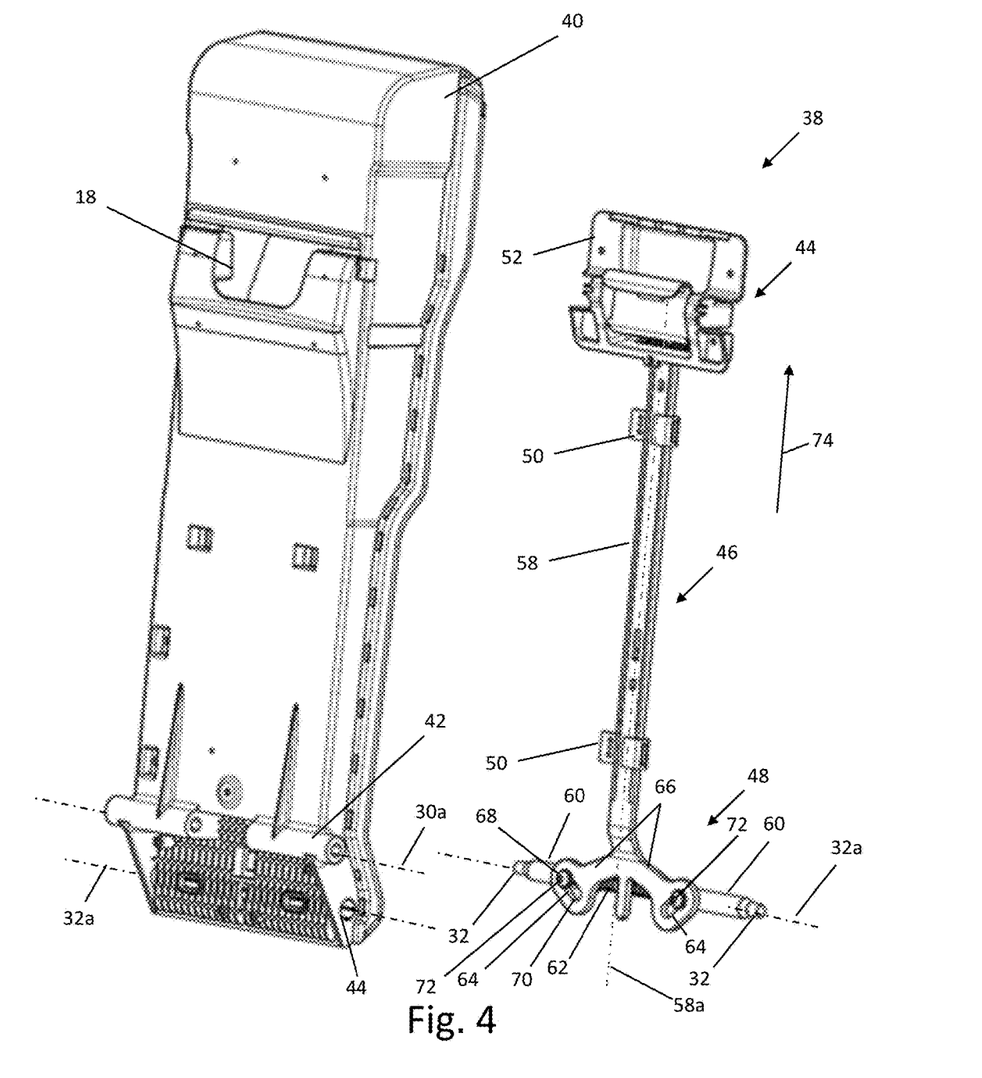
FIG. 4 is an enlarged perspective view of a portion of the armrest illustrated in FIG. 3 and a release mechanism.

Referring now to FIG. 4, the armrest 12 is shown with the trim 21 removed and further exploded, with an armrest release mechanism, indicated generally at 38, removed from an armrest base 40. The armrest base 40 includes an axle mount 42 that accommodates the pivot axle 30. The armrest base 40 also includes a latch slot 43, the purpose of which will be described below. The armrest release mechanism 38 includes a handle assembly, indicated generally at 44, a slider, indicated generally at 46, and a latch assembly, indicated generally at 48. Two optional slide brackets 50 engage the slider 46 and are fixed relative to the armrest base 40. The slide brackets 50 allow limited movement of the slider 50 relative to the armrest base 40, as will be described below.

Figure 5:
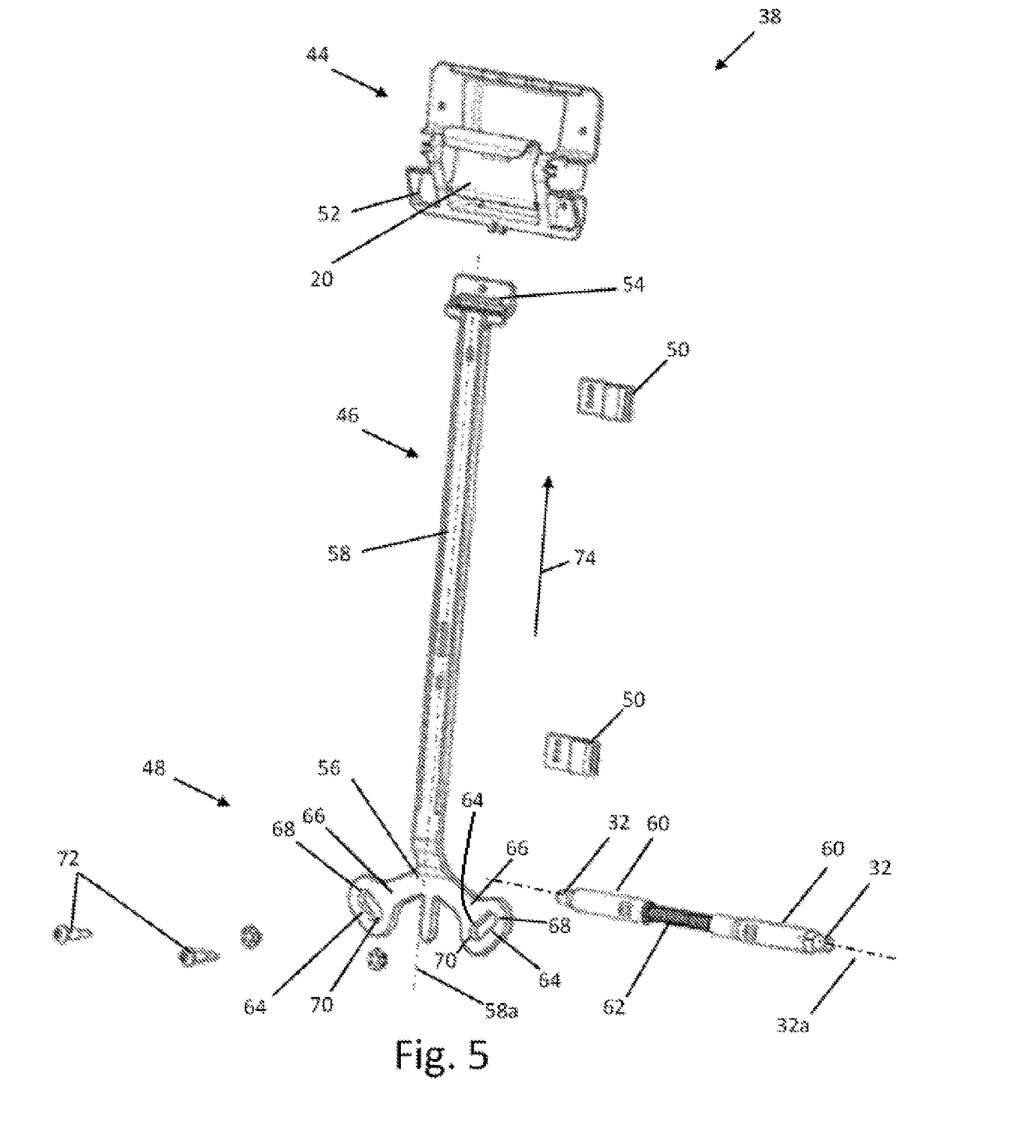
FIG. 5 is an exploded perspective view of the release mechanism illustrated in FIG.4.

Referring now to FIG. 5, an exploded view of the armrest release mechanism 38 is shown. The handle assembly 44 includes the release handle 20 and a handle base 52. The slider 46 includes a handle end 54, a latch end 56, and a shaft 58 that extends from the handle end 54 to the latch end 56 along a slide axis 58a. The latch assembly 48 includes a pair of latch extensions 60 that extend along the latch axis 32a. The illustrated latch extensions 60 are made of plastic and are substantially cylindrical in shape, but may be made of any desired material and may have any desired shape. One of the latch pins 32 is located on an outer, opposed end of each of the latch extensions 60. The illustrated latch pins 32 are integral portions of the respective latch extension 60, but they may be separate components if desired. A latch spring 62 is located between the latch extensions 60. The latch spring 62 is a compression spring and applies a force to each of the latch extensions 60 to push them apart from one another along the latch axis 32a.

The latch end 56 of the slider 46 includes a pair of extension slots 64 located on opposite sides of the slide axis 58a. The illustrated extension slots 64 are located on separate wings 66 that extend laterally away from the shaft 58. The illustrated wings 66 are integrally formed with the shaft 58, but may be separate components if desired. Additionally, the wings 66 may be replaced with any desired configuration, such as a single plate on the shaft 58. Each of the extension slots 64 is oriented at an angle relative to the slide axis 58a. In the illustrated embodiment, each extension slot 64 is oriented at approximately a 45-degree angle to the slide axis 58a, but this may be some other desired angle. Each extension slot 64 extends from a slot latch end 68 to a slot unlatch end 70 that is closer to the slide axis 58a and farther from the handle end 54 of the slider 46 than the associated slot latch end 68. Each latch extension 60 includes an extension pin 72 that is located in one of the extension slots 64. In the illustrated embodiment, each extension pin 72 is a step bolt that is attached to the latch extension 60 and a rotation bushing that is supported on the step bolt 72. However, the extension pin 72 may be any desired device or construction and may, for example, be an integral part of the latch extension 60. Each extension pin 72 is fixed relative to the respective latch extension 60 and is able to move relative to the slider 46 within the respective extension slot 64.

Figure 6:
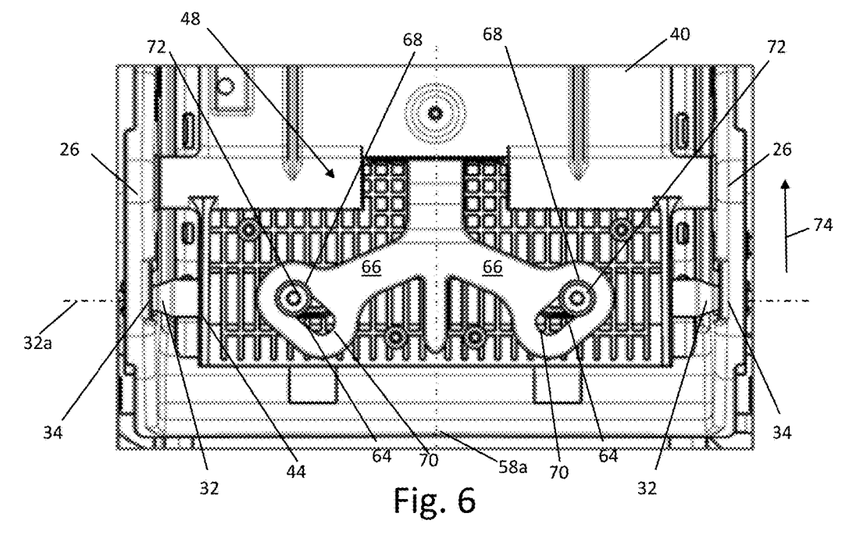
FIG. 6 is an enlarged rear elevational view of portions of the armrest and release mechanism showing the latch mechanism in a latched position.

Referring now to FIG. 6, a rear view of a lower portion of the assembled armrest 12 connected to the frame 14 is shown. The latch extensions 60 are located within the respective latch slots 43 in the armrest base 40 and are substantially hidden in FIG. 6. The outer end portions of each of the latch extensions 60 and the latch pins 32 are visible. The latch pins 32 extend into the respective latch openings 34 on the support plates 26. The extension pins 72 are also located within the extension slots 64, near the slot latch ends 68 of the respective extension slots 64. In the condition shown in FIG. 6, the armrest 12 is prevented from rotating relative to the frame 14 because the latch pins 32 engage the support plates 26, as previously described.

Figure 7:
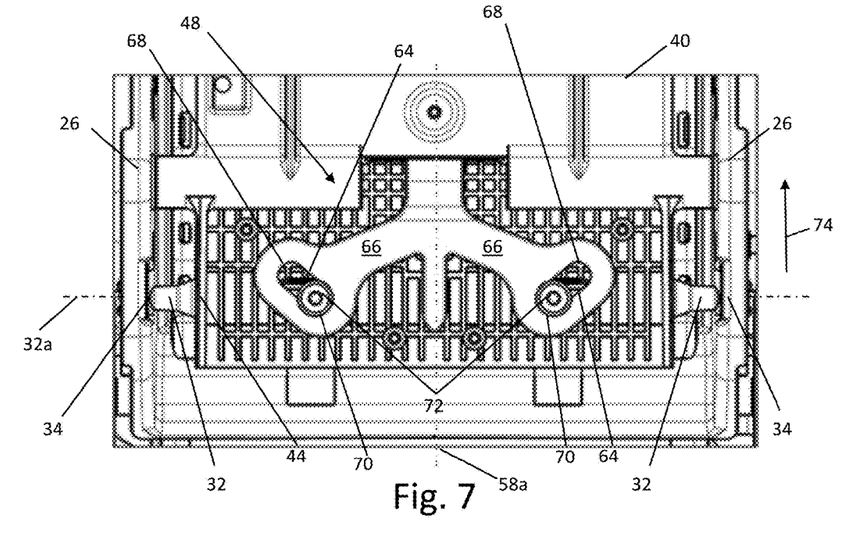
FIG. 7 is a view similar to that shown in FIG. 6 showing the release mechanism in an unlatched position.

Referring now to FIG. 7, a view similar to FIG. 6 is shown after the slider 46 has been moved in a release direction 74 parallel to the slide axis 58a and toward the handle end 54 of the slider 46. As previously described, the extension pins 72 are fixed relative to the respective latch extensions 60 and are able to move relative to the slider 46 within the respective extension slots 64. Each latch extension 60 is located in the associated latch slot 43 and is able to move relative to the armrest base 40 in either direction parallel to the latch axis 32a. When the slider 46 is moved in the release direction 74, the extension pins 72 engage a wall of respective extension slot 64 and are forced, as a result, to move relative to the armrest base 40 in a direction parallel to the latch axis 32a such that the extension pins 72 and the respective latch extensions 60 are moved toward the slide axis 58a. Therefore, the latch extensions 60 move toward each other and, as a result, pull the latch pins 32 out of the respective latch openings 34 on the support plates 26 to the condition shown in FIG. 7. In this condition, the latch pins 32 do not engage the support plates 26, and the armrest 12 is able to rotate relative to the frame 14 around the pivot axis 30a.

As previously described, the latch spring 62 is located between the latch extensions 60 and applies a force to each of the latch extensions 60 to bias them apart from one another along the latch axis 32a. The latch spring 62 is not visible in FIG. 7 because it is located within the latch slot 43 and is hidden by the armrest base 40. The force applied by the latch spring 62 will also bias the extension pins 72 apart from one another along the latch axis 32a. When the extension pins 72 are pushed away from each other along the latch axis 32a, they will engage the walls of the respective extension slots 64 and will bias the slider 46 in a direction opposite the release direction 74. Thus, the latch spring 62 biases the armrest release mechanism 38 to the condition shown in FIG. 6. It should be appreciated that the movement of the extension pins 72 in the direction parallel to the latch axis 32a is limited by the length of the extension slots 64. When the extension pin 72 reaches the slot latch end 68, the extension pin 72 and the latch extension 60 are prevented from moving farther from the slide axis 58a. When the extension pin 72 reaches the slot unlatch end 70, the extension pin 72 and the latch extension 60 are prevented from moving closer to the slide axis 58a.

It should be appreciated that the extension pins 72 may be pushed away from each other along the latch axis 32a when the armrest 12 is not in the storage position relative to the seat 10. In that case, the latch pins 32 will engage the respective support plates 26 in the latch pin channels 36. The armrest 12 may continue to be rotated relative to the seat 10 until the armrest 12 is returned to the storage position, when the latch pins 32 will enter the respective latch openings 34 on the support plates 26 to the condition shown in FIG. 7. The armrest 12 is then latched in position relative to the seat 10.

Figure 8:
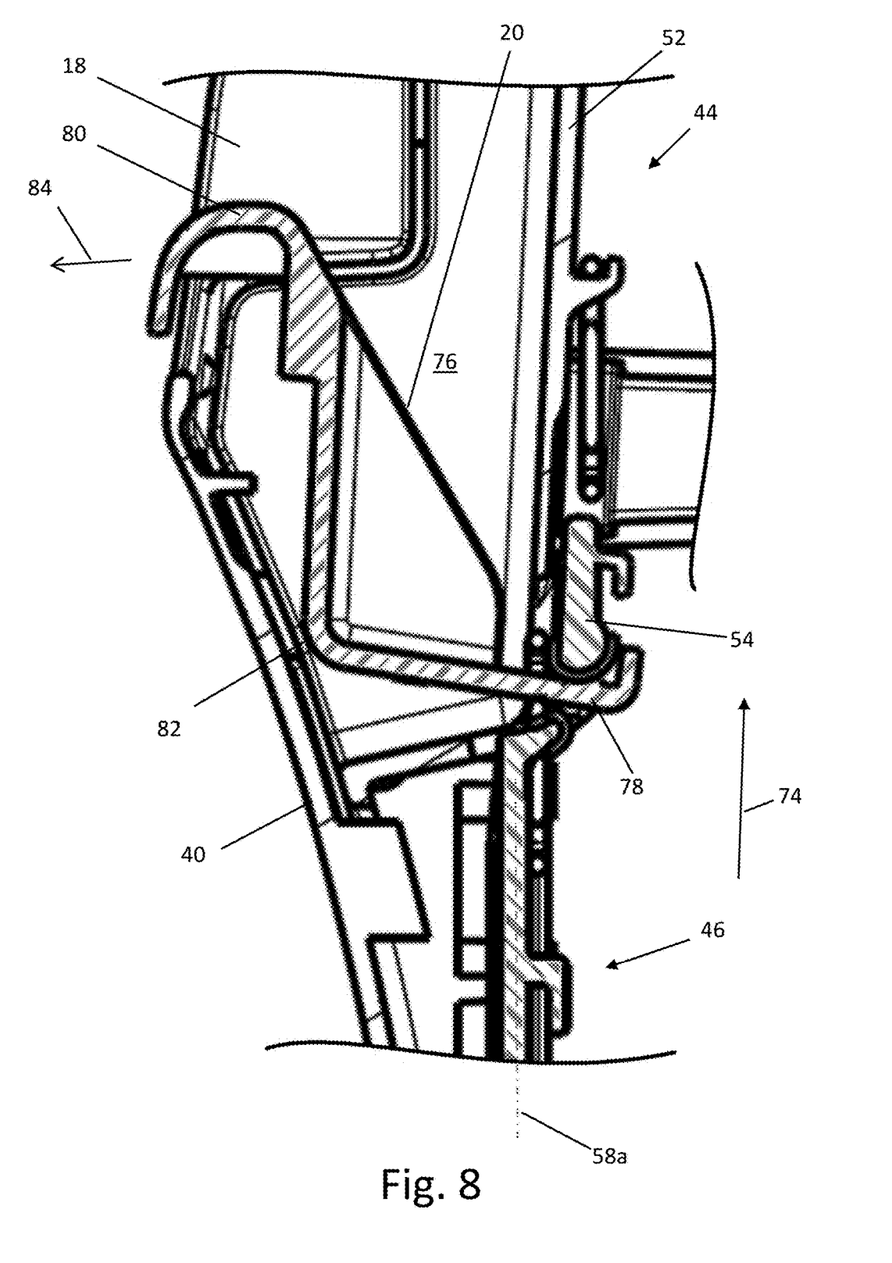
FIG. 8 is an enlarged cross-sectional view of a release handle of the armrest and the release mechanism, taken along the line 8-8 of FIG. 2.

Referring now to FIG. 8, a cross-sectional view of a portion of the armrest 12 taken through the handle assembly 44 is shown. The cross-section shown in FIG. 8 is taken along line 8-8 of FIG. 2. The handle base 52 is attached to the armrest base 40 to define a handle space 76 therebetween. The release handle 20 is located in the handle space 76, and the handle opening 18 provides access for the occupants to reach the release handle 20. The release handle 20 includes a handle mate end 78, a grip end 80, and a pivot area 82 located therebetween. The handle mate end 78 engages the handle end 54 of the slider 46 for limited relative movement between the release handle 20 and the slide 46. An occupant may grasp the grip end 80 of the release handle 20 and apply a force in a handle release direction 84, which is generally forward when the armrest 12 is in the storage position. This force will cause the release handle 20 to rotate relative to the armrest base 40 about the pivot area 82, where the release handle 20 engages the armrest base 40. This rotation of the release handle 20 will cause the handle mate end 78 to move upwardly as viewed in FIG. 8. The upward movement of the handle mate end 78 will also move the engaged slider 46 upwardly in the release direction 74. Thus, the force applied to the release handle 20 will pull the latch pins 32 out of the respective latch openings 34, as previously described. When the occupant stops applying a force to release handle 20, the latch spring 62 will bias the slider 46 in the direction opposite the release direction 74 as also previously described. This will cause the handle mate end 78 to move downwardly as viewed in FIG. 8, causing the release handle 20 to rotate relative to the armrest base 40 about the pivot area 82 back to the position shown in FIG. 8. Thus, when an occupant applies the force to the release handle 20, the armrest 12 is unlatched and may be moved from the storage position to the use position. When the armrest 12 is moved from the use position to the storage position, the armrest 12 will be latched in the storage position and the release handle 20 returned to the position illustrated in FIG. 8.

In the preceding description of the preferred embodiment of the armrest release mechanism 38, a particular armrest 12 was used as an example. However, it should be appreciated that the armrest release mechanism 38 may be used with any desired armrest or with any desired device that is connected to a frame for relative rotational movement. The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle armrest comprising:
   an armrest base including a pivot axle that extends along a pivot axis; and
   a release mechanism that includes:
   (1) a slider including a handle end, a shaft extending from the handle end, and a latch end extending from the shaft, the shaft being supported on the armrest base for relative movement along a slide axis, the latch end having a pair of extension slots that each extend at an angle relative to the slide axis from a latch end to an unlatch end, wherein each of the unlatch ends of the pair of extension slots is closer to the slide axis and farther from the handle end of the slider than the associated latch end;
   (2) a pair of latch extensions supported on the armrest base for relative movement along a latch axis that is substantially parallel to the pivot axis, each of the pair of latch extensions including an extension pin attached thereto that is located in an associated one of pair of the extension slots such that when the slider moves in a release direction, the extension pins engage the respective extension slots and cause the latch extensions to move along the latch axis toward each other; and
   (3) a latch spring that applies a force to each of the latch extensions and biases the latch extensions apart from each other.

2. The vehicle armrest of claim 1, further comprising a release handle supported on the armrest base for relative rotational movement, wherein when the release handle is moved in a handle release direction relative to the armrest base, the slider is moved in the release direction.

3. The vehicle armrest of claim 2, wherein the latch spring also biases the slider in a direction opposite the release direction.

4. The vehicle armrest of claim 3, wherein the release handle is also biased in a direction opposite the handle release direction.

* * * * *